(12) United States Patent
Hsiao

(10) Patent No.: US 7,244,023 B1
(45) Date of Patent: Jul. 17, 2007

(54) AUXILIARY EYEGLASS FRAME WITH A POSITION-ADJUSTABLE DEVICE

(76) Inventor: Yu-Teng Hsiao, No. 182, Yu Hsiao Road, Chia I (TW)

( * ) Notice: Subject to any disclaimer, the term of this patent is extended or adjusted under 35 U.S.C. 154(b) by 0 days.

(21) Appl. No.: 11/362,858

(22) Filed: Feb. 28, 2006

(51) Int. Cl.
*G02C 7/08* (2006.01)
(52) U.S. Cl. .......................................... 351/57; 351/47
(58) Field of Classification Search ................. 351/47, 351/48, 57, 58, 124–135
See application file for complete search history.

(56) References Cited

U.S. PATENT DOCUMENTS 6,702,440 B1 * 3/2004 Park ........................... 351/57
6,705,721 B1 * 3/2004 Chen ........................... 351/47

* cited by examiner

*Primary Examiner*—Huy Mai
(74) *Attorney, Agent, or Firm*—Rosenberg, Klein & Lee

(57) ABSTRACT

An auxiliary eyeglass frame is provided with a position-adjustable device pivotally securing to the bridge. The position-adjustable device includes a mounting block, at least one magnetic piece is provided in the mounting block, two through bores are respectively provided adjacent to the left side and right side of the at least one magnetic piece, each through bore is provided to receive one fixing piece and one pivotal connecting article, and the pivotal connecting articles are disposed on the bridge of the auxiliary eyeglass frame.

2 Claims, 8 Drawing Sheets

AUXILIARY EYEGLASS FRAME WITH A POSITION-ADJUSTABLE DEVICE

BACKGROUND OF THE INVENTION

1. Field of the Invention

This invention relates to an auxiliary eyeglass frame which is supported by and engaged with a primary eyeglass frame with hidden magnetic attachment structure, and more particularly to an auxiliary eyeglass frame, which is provided with a position-adjustable device at the bridge, so as for the auxiliary eyeglass frame to be conveniently raised up for storage or moved down for use alternatively.

2. Description of the Related Art

The inventor of the present invention had invented eyeglass frames with hidden magnetic attachment structure. Referring to FIGS. 1 and 2, at least one magnetic piece 10b is respectively provided in the bridge 10a of an auxiliary eyeglass frame 10 and in the bridge 20a of a primary eyeglass frame 20, so as to have a beautiful appearance and to prolong the service life of the magnetic pieces.

However, while the auxiliary eyeglass frame 10 is detached from the primary eyeglass frame 20, it is troublesome for a wearer to find a proper place to store up the auxiliary eyeglass frame 10.

SUMMARY OF THE INVENTION

Therefore, the objective of the present invention is to provide an auxiliary eyeglass frame with a position-adjustable device that can substantially obviate the drawback of the related art.

An objective of the present invention is to provide an auxiliary eyeglass frame which is provided with a position-adjustable device, so as for the auxiliary eyeglass frame to be conveniently raised up for storage or moved down for use alternatively while magnetically securing to a primary eyeglass frame.

Accordingly, the auxiliary eyeglass frame is provided with a position-adjustable device pivotally securing to the bridge. The position-adjustable device includes a mounting block, at least one magnetic piece is provided in the mounting block, two through bores are respectively provided adjacent to the left side and right side of the at least one magnetic piece, each through bore is provided to receive one fixing piece and one pivotal connecting article, and the pivotal connecting articles are disposed on the bridge of the auxiliary eyeglass frame.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
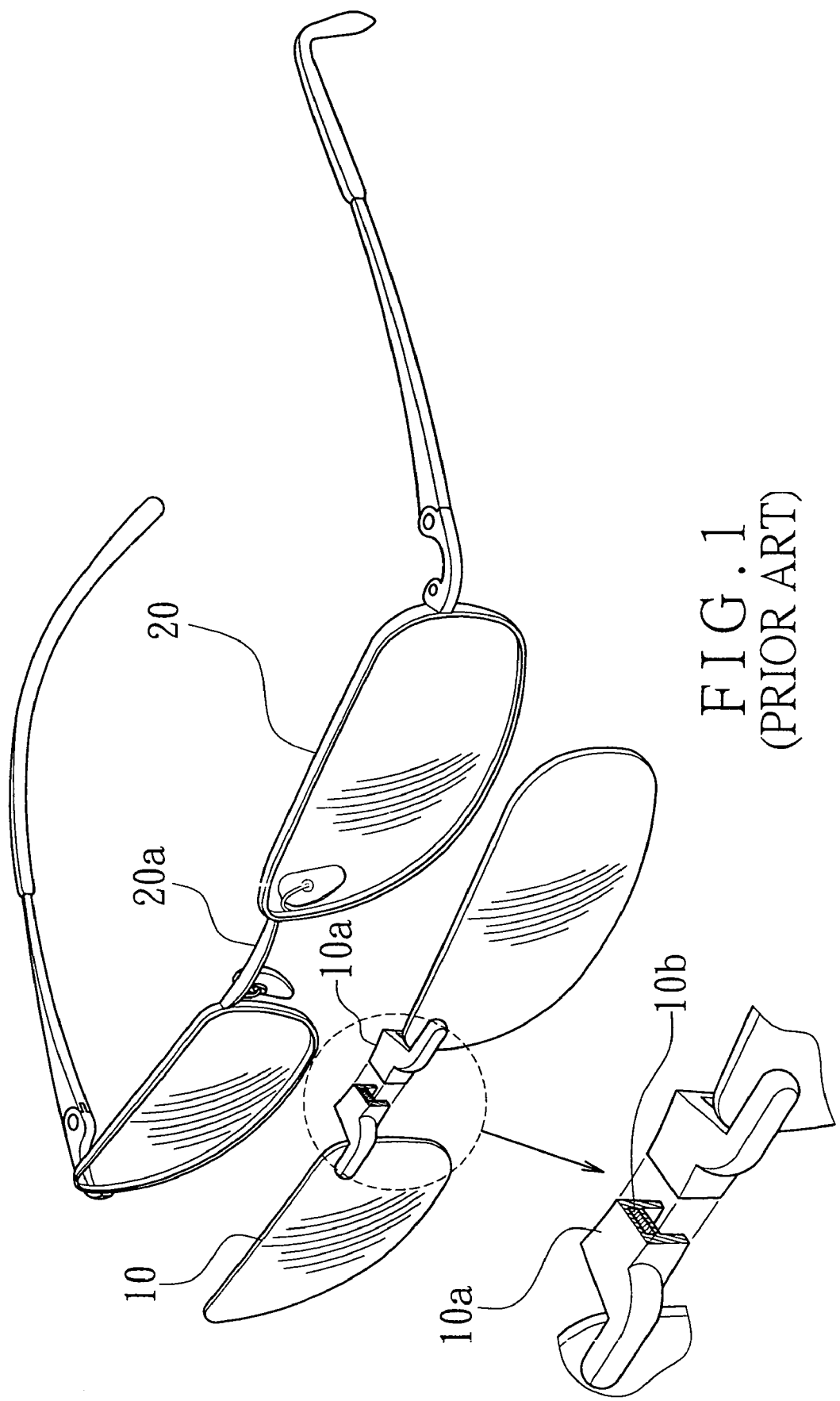
FIG. 1 is a perspective exploded view of conventional auxiliary and primary eyeglass frames with magnetic attachment structure as well as an enlarged view of the bridge of the conventional auxiliary eyeglass frame.
Figure 2:
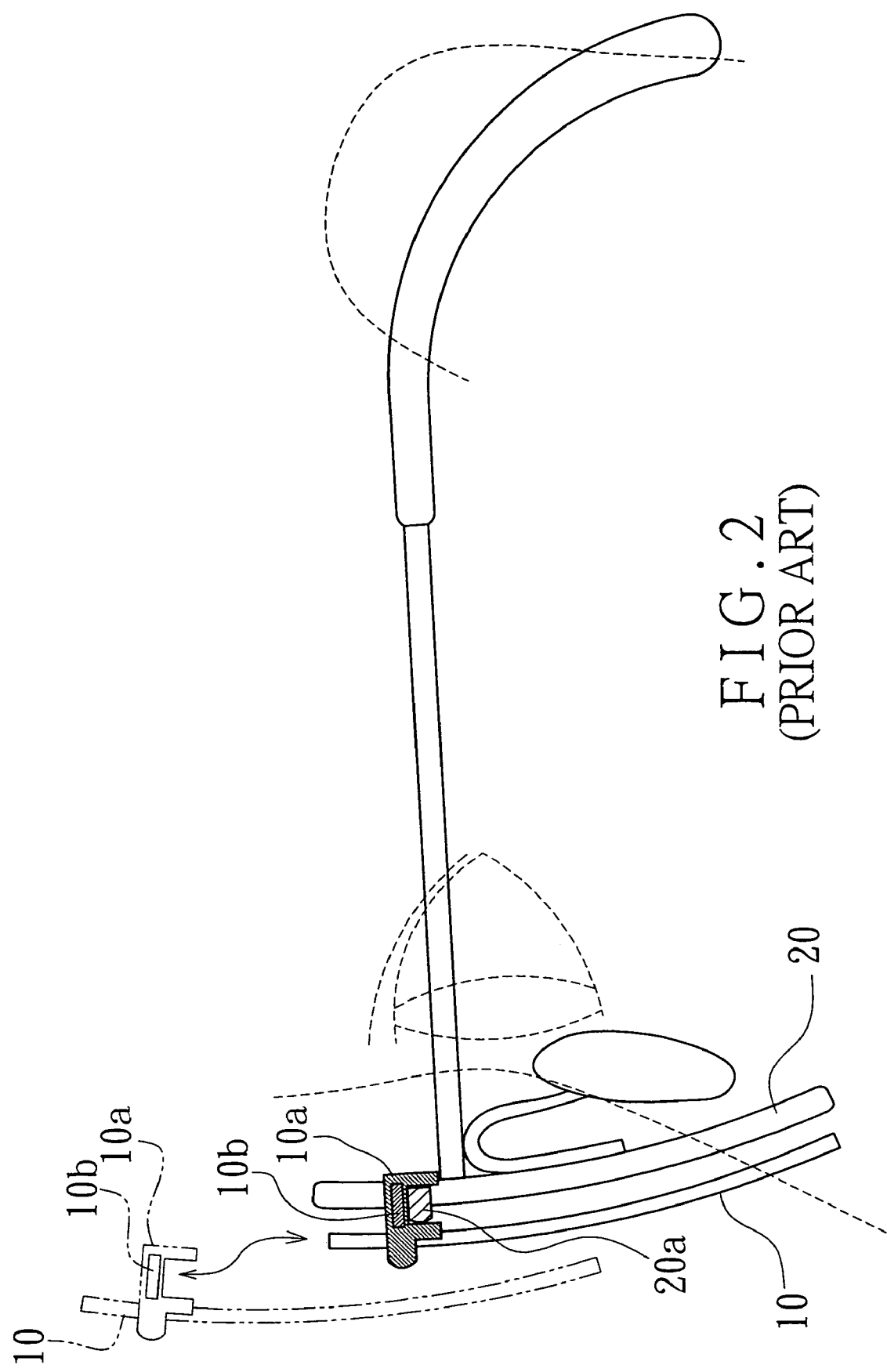
FIG. 2 is a schematic side sectional view of the conventional auxiliary and primary eyeglass frames with magnetic attachment structure in assembled configuration.
Figure 3:
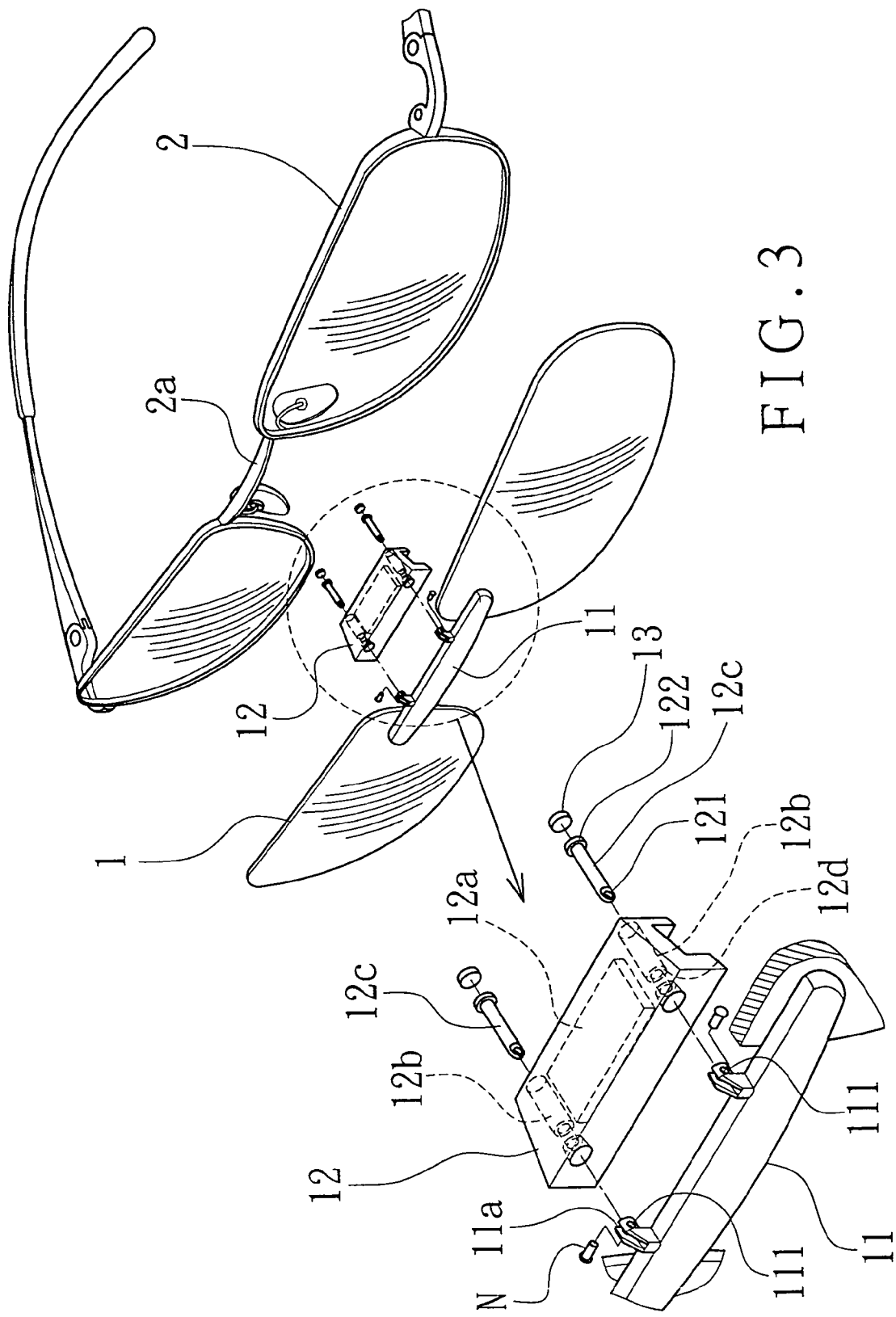
FIG. 3 is a perspective exploded view of an embodiment of the auxiliary eyeglass frame with a position-adjustable device before securing to a primary eyeglass frame as well as an enlarged exploded view of the position-adjustable device at the bridge of the auxiliary eyeglass frame in accordance with the present invention.

Referring to FIG. 3, an embodiment of the auxiliary eyeglass frame 1 in the present invention is provided with a position-adjustable device in order to be conveniently raised up for storage or moved down for use alternatively.

The position-adjustable device includes a mounting block 12, which is provided to pivotally secure to the bridge 11 of the auxiliary eyeglass frame 1 and is firmly magnetically mounted on the bridge 2a of a primary eyeglass frame 2, at least one magnetic piece 12a is provided in the mounting block 12, two through bores 12b are respectively provided adjacent to the left side and right side of the at least one magnetic piece 12a, each through bore 12b is provided to receive one fixing piece 12c and one pivotal connecting article 11a, and the pivotal connecting articles 11a are disposed on the bridge 11 of the auxiliary eyeglass frame 1.

While being assembled, each fixing piece 12c is inserted into the rear end of each through bore 12b, after the tail of each fixing piece 12c penetrates outward the front end of each through bore 12b, the hole 121 in the tail of each fixing piece 12c is registered with the holes 111 in each pivotal connecting article 11a on the bridge 11, and then a rivet N penetrates through the holes 111, 121 of each fixing piece 12c and each pivotal connecting article 11a, so as for the mounting block 12 to pivotally secure to the bridge 11 of the auxiliary eyeglass frame 1. At last, a tap 13 is inlaid in the rear end of each through bore 12b.

Figure 4:
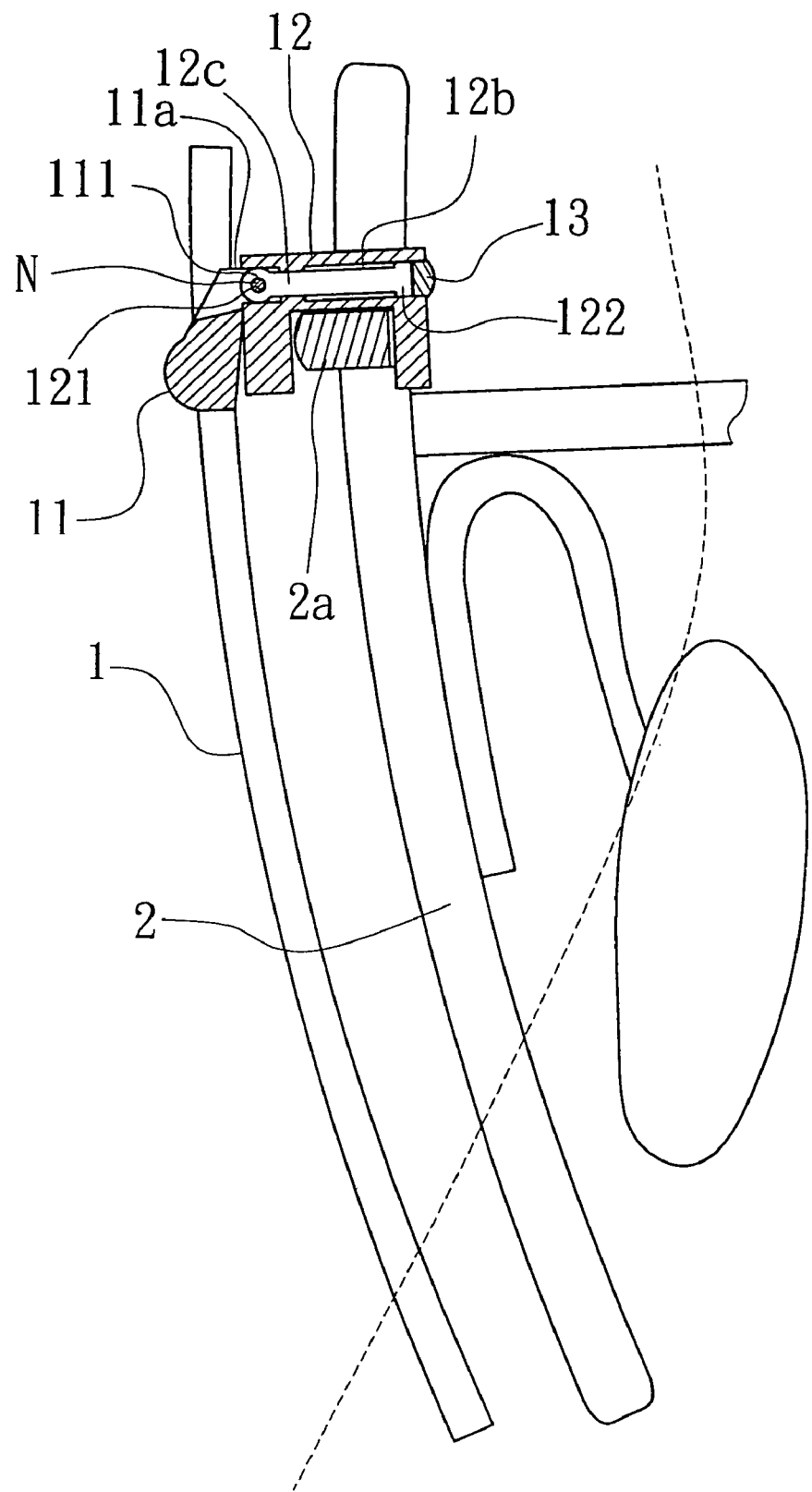
FIG. 4 is a side sectional view of an embodiment of the auxiliary eyeglass frame with a position-adjustable device in accordance with the present invention while securing to a primary eyeglass frame.
Figure 5:
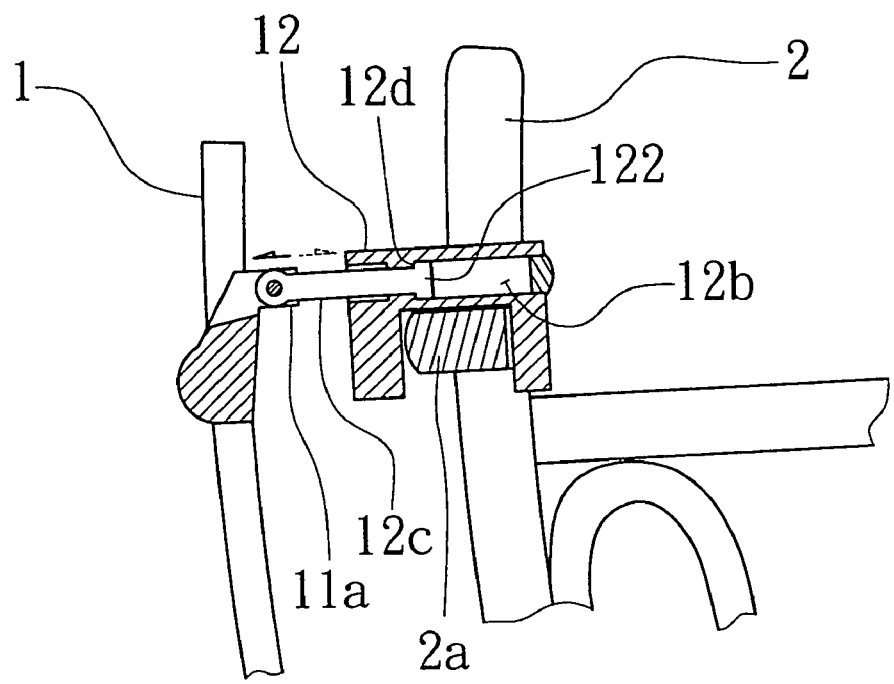
FIG. 5 is a schematic view showing an embodiment of the auxiliary eyeglass frame as well as the fixing pieces in accordance with the present invention being pulled forward.
Figure 6:
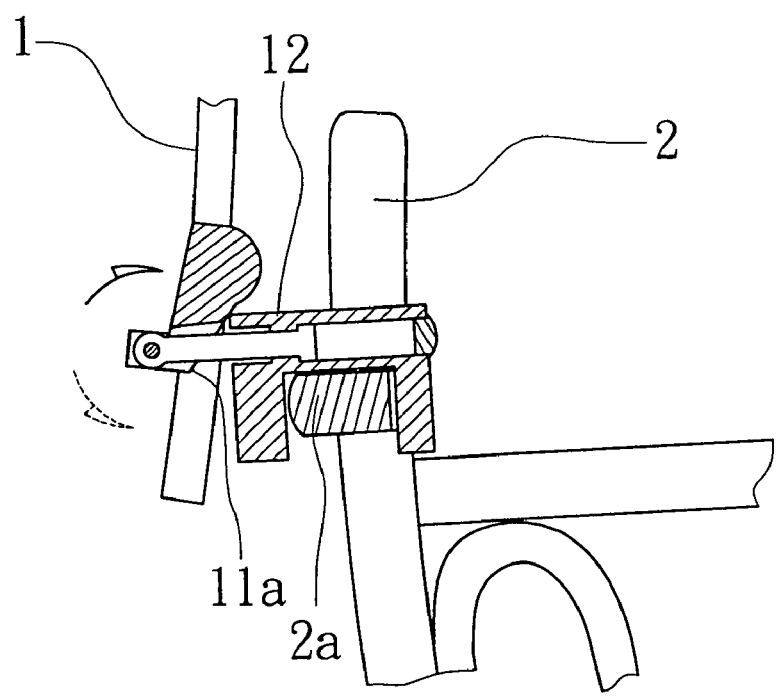
FIG. 6 is a schematic view showing an embodiment of the auxiliary eyeglass frame in accordance with the present invention being pivotally raised up for storage.

While being applied, the mounting block 12 securing to the auxiliary eyeglass frame 1 is firmly mounted on the bridge 2a of a primary eyeglass frame 2 by means of the mutual magnetic attraction of the magnetic pieces 12a in the mounting block 12 and the bridge 2a (alternatively made of metal or provided with at least one magnetic piece), refer ring to FIG. 4. If the auxiliary eyeglass frame 1 is not used, it can be pulled forward, the pivotal connecting articles 11a and fixing pieces 12c are moved forward accordingly until the head 122 of each fixing piece 12c is stopped by each inner wall 12d in each through bore 12b, as shown in FIG. 5, and then the auxiliary eyeglass frame 1 is raised up to a specific position, so as for the pivotal connecting articles 11a to be against the mounting block 12, as shown in FIG. 6.

Figure 7:
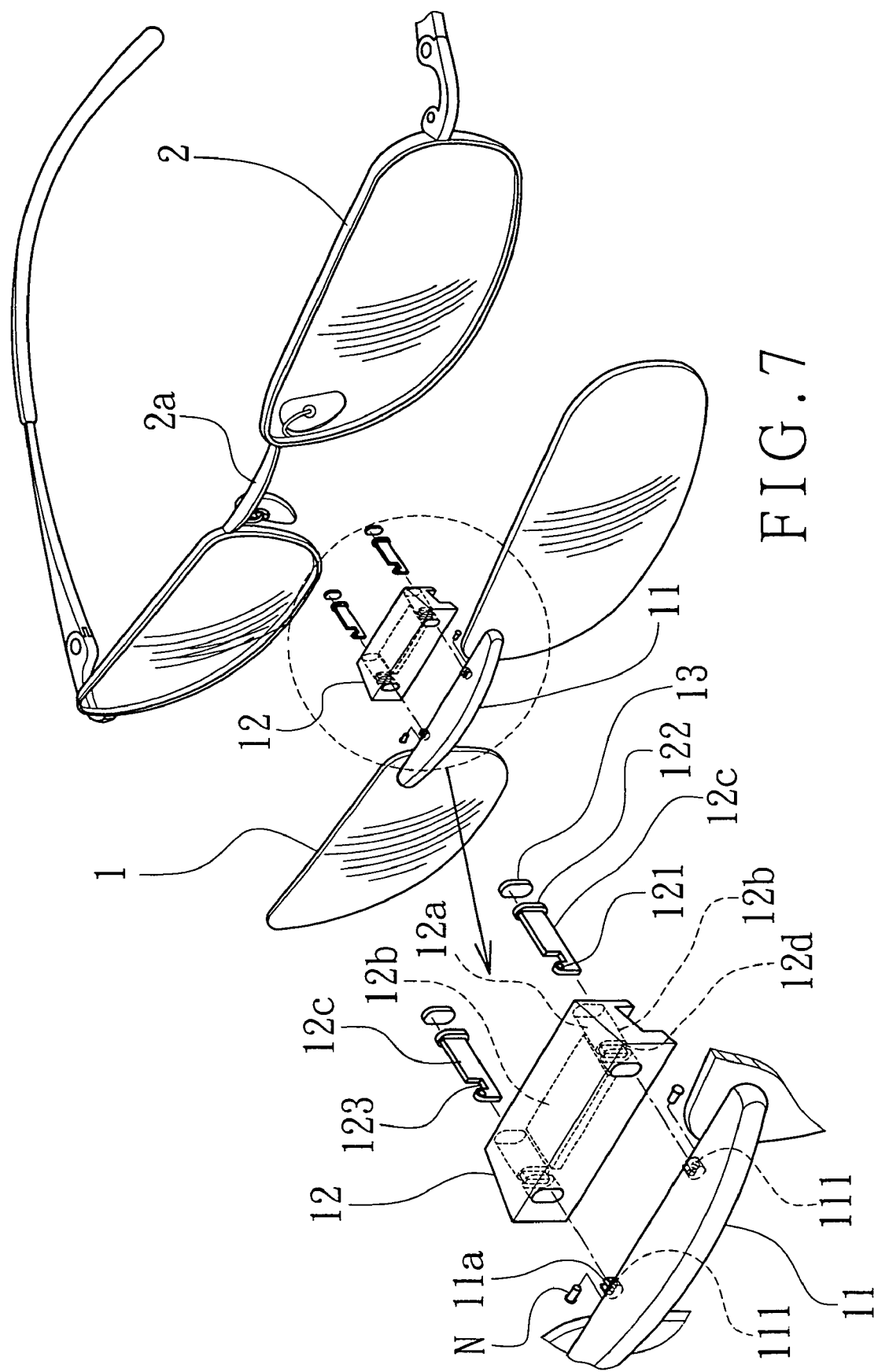
FIG. 7 is a perspective exploded view of another embodiment of the auxiliary eyeglass frame with a position-adjustable device before securing to a primary eyeglass frame as well as an enlarged exploded view of the position-adjustable device at the bridge of the auxiliary eyeglass frame in accordance with the present invention.
Figure 8:
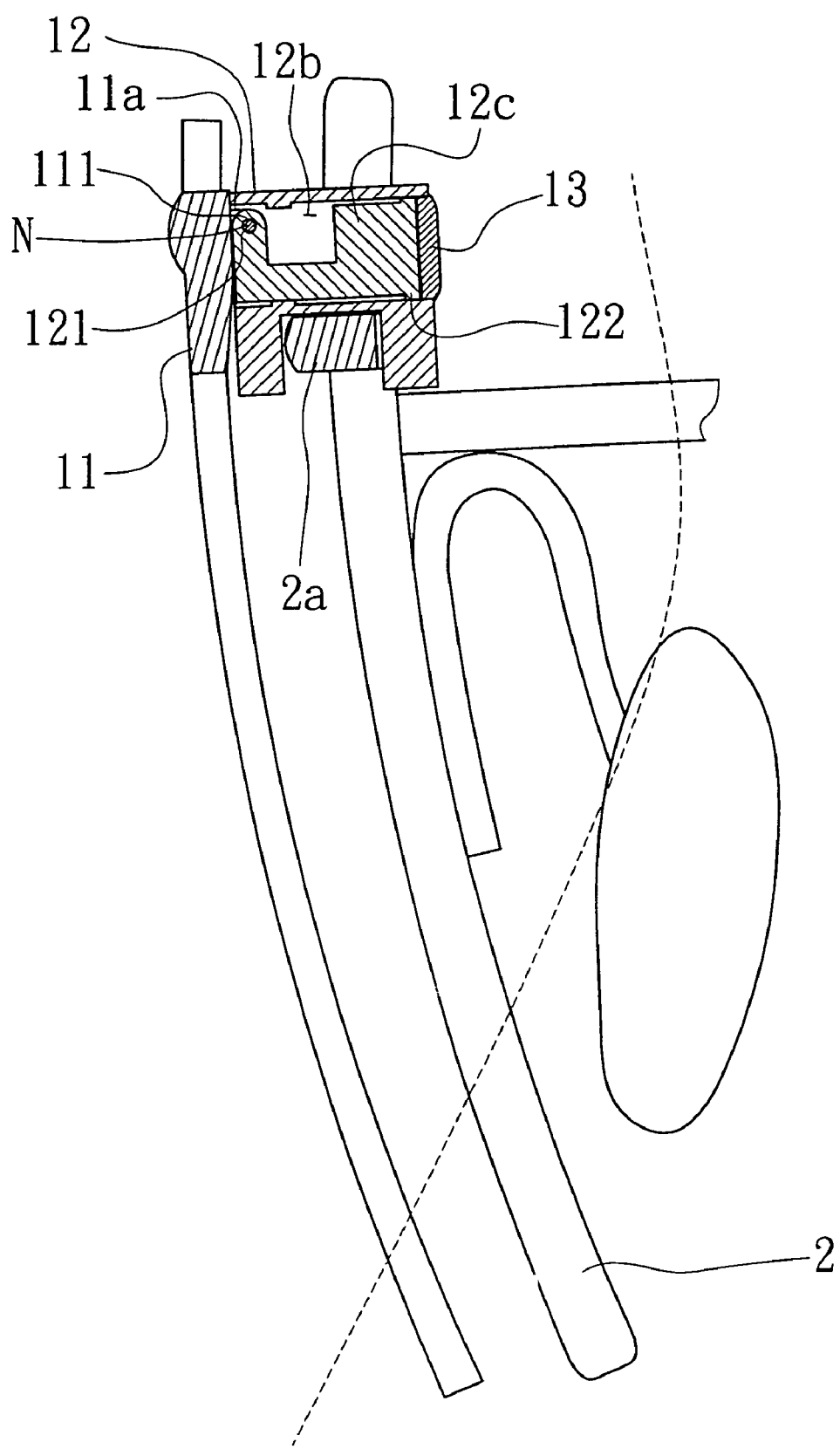
FIG. 8 is a side sectional view of another embodiment of the auxiliary eyeglass frame with a position-adjustable device in accordance with the present invention while securing to a primary eyeglass frame.
Figure 9:
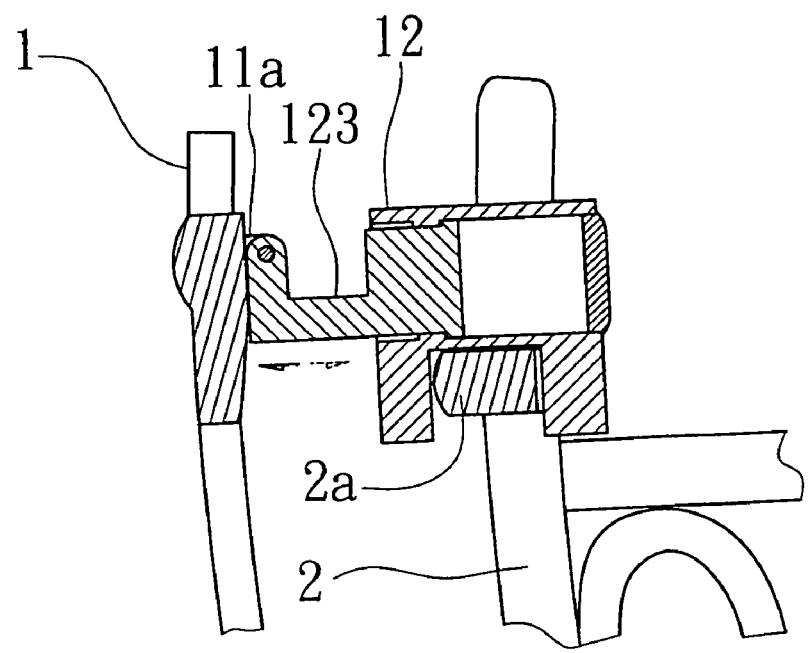
FIG. 9 is a schematic view showing another embodiment of the auxiliary eyeglass frame as well as the fixing pieces in accordance with the present invention being pulled forward; and, FIG. 10 is a schematic view showing another embodiment of the auxiliary eyeglass frame in accordance with the present invention being pivotally raised up for storage.
Figure 10:
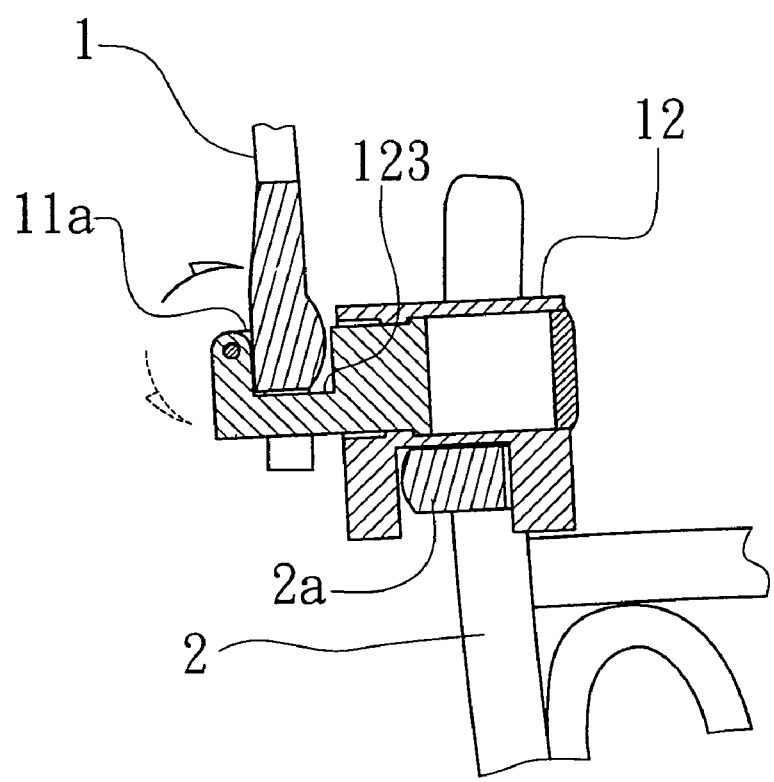

Referring to FIGS. 7 and 8, the assembly of another embodiment of the auxiliary eyeglass frame 1 in the present invention with a position-adjustable device is the same as described above. While being applied, referring to FIG. 9, the auxiliary eyeglass frame 1 is raised up to a specific position, so as for each pivotal connecting article 11a to rest in the cavity 123 of each fixing piece 12c, as shown in FIG. 10.

While the preferred embodiments of the invention have been described above, it will be recognized and understood that various modifications may be made therein and the appended claims are intended to cover all such modifications which may fall within the spirit and scope of the invention.

What is claimed is:

1. A position-adjustable device of an auxiliary eyeglass frame securing to a primary eyeglass frame with hidden magnetic attachment structure comprising:

a mounting block being provided to pivotally secure to the bridge of an auxiliary eyeglass frame and being firmly magnetically mounted on the bridge of a primary eyeglass frame, said mounting block having at least one magnetic piece provided therein, said at least one magnetic piece having two through bores respectively formed adjacent a left and right side of said at least one magnetic piece, wherein each said through bore is provided to receive one fixing piece and one pivotal connecting article, said pivotal connecting article being disposed on the bridge of the auxiliary eyeglass frame.

2. A position-adjustable device of an auxiliary eyeglass frame as recited in claim 1, wherein each said fixing piece is provided with a cavity.

* * * * *